UNITED STATES PATENT OFFICE.

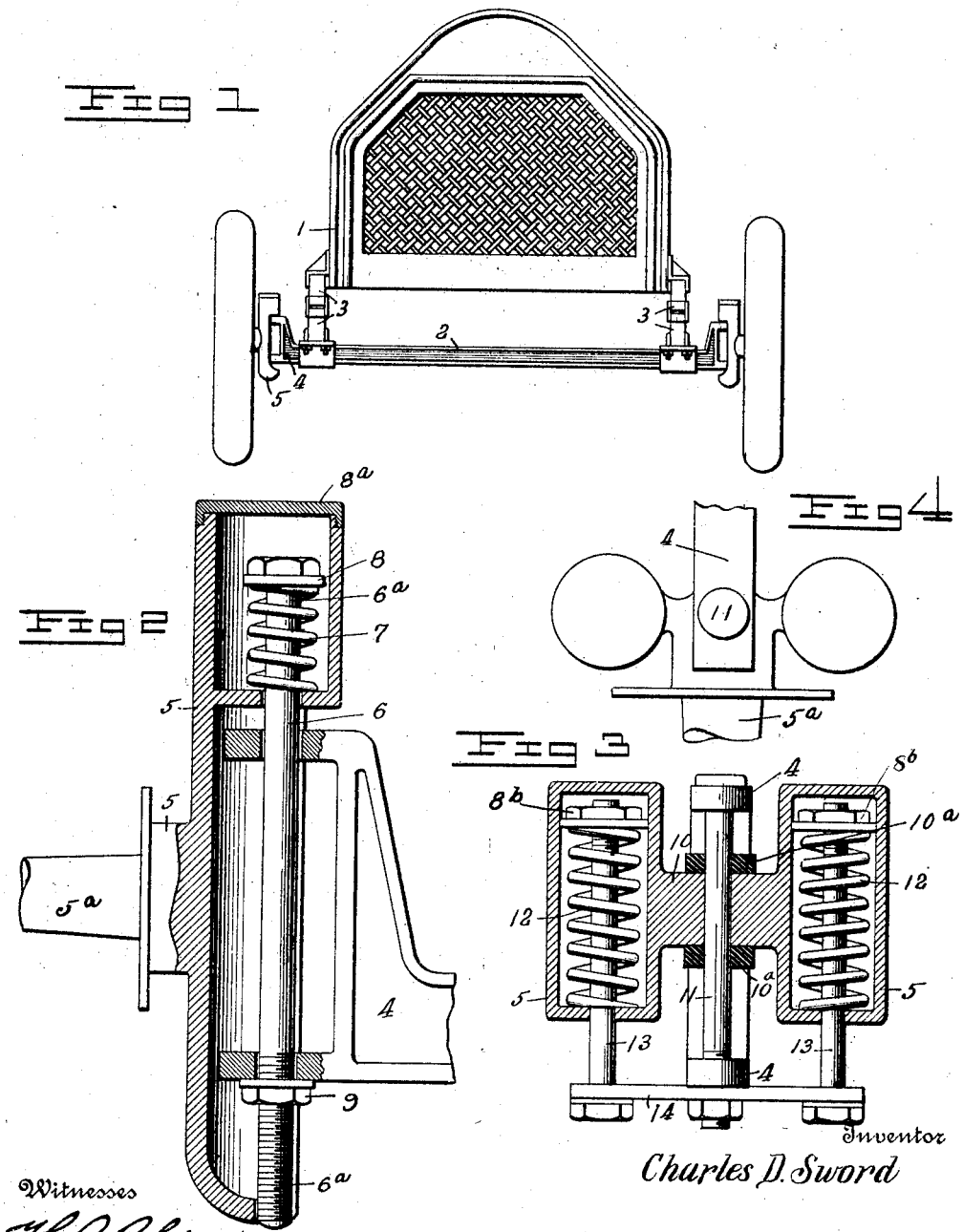

CHARLES DURM SWORD, OF NEW YORK, N. Y.

SHOCK-ABSORBER.

1,002,470. Specification of Letters Patent. Patented Sept. 5, 1911.

Application filed February 8, 1910. Serial No. 542,748.

*To all whom it may concern:*

Be it known that I, CHARLES DURM SWORD, a citizen of the United States, residing at New York, in the county of New York and State of New York, have invented new and useful Improvements in Shock-Absorbers, of which the following is a specification.

This invention relates to improvements in shock absorbers for vehicles, chiefly for automobiles, and it has for its object to provide a device which shall be of simple construction, quick in action and easily applied to the standard forked knuckle-ends of axles of vehicles without change or alteration of any kind in the axles or in their knuckle ends. This desirable feature is rendered possible by the novel manner of disposing the shock absorbers outside the knuckle ends of the axle in either a vertical or transverse relation thereto. As thus mounted, the shock absorbers are interposed for operation between the body springs of the vehicle and the wheels or ground, so that the major portion at least of the shock or jolt incident to travel over rough ground or obstacles is compensated or absorbed primarily by the movement or play of the wheels and secondarily of the axle. As a result of this arrangement of parts, the vertical movement of the wheels caused by the rough ground over which the vehicle travels will be so minimized and destroyed by the shock absorbers that it will not be imparted to the body of the vehicle and hence the latter will travel steadily and without vibration.

The invention has also for its object the disposition of the shock absorbers in relation to the body springs of the vehicle in such manner that the resiliency of the former, being more sensitive, will absorb the ordinary shocks and jolts incident to travel, while the body springs, being relatively stronger or stiffer and therefore less rapid and sensitive in their operation, will take their part in absorbing the more serious shocks and jolts.

In the accompanying drawings:—Figure 1 is a front view of an automobile provided with one form of the invention combined with the front axle, the spring shock absorber being shown in a state of partial compression; Fig. 2, a sectional view thereof; Fig. 3, a sectional view of a different or modified form of the organization shown in Fig. 1; and, Fig. 4, a plan view of the invention shown in Fig. 3.

Like reference characters are used to designate the same parts in all the figures.

In Figs. 1 and 2 of the drawing, the reference numeral 1 indicates the body of an automobile, and 2 the front axle thereof on which are fastened, in any suitable manner, body springs 3 which may be of any well known or usual type employed for this purpose. The ends of the axle are each formed with a forked knuckle end 4 such as are at present in use. Each knuckle end 4 of the axle has pivoted thereon by means of a bolt 6 a forked steering knuckle 5 carrying the usual wheel spindle $5^a$ and movable longitudinally of the bolt. The bolt 6 which forms the pivot of the two knuckle joints projects below the knuckle end of the axle and is there provided with a nut and washer 9 screwed on said bolt to bear against the under side of the knuckle end. The opposite end of the bolt projects upwardly through and beyond the upper forks of the axle and steering-knuckle, and constitutes a post $6^a$, which post has operative connection with the axle by the bolt 6 and nut 9. Upon this post, outside the forked ends of the axle, is arranged a coiled compression spring shock-absorber 7, which at one end bears against the upper jaw of the steering-knuckle and at its opposite end against an adjustable abutment 8, shown as a nut. The nut 8 is adjustable on the post $6^a$ for the purpose of positioning the vehicle-axle in alinement with the wheel-spindle $5^a$, which is accomplished through the medium of the bolt 6 and nut 9.

From the foregoing, it will be clearly seen that the steering knuckles are yieldingly connected with the axle, and as the jaws of the steering knuckles are separated from each other a greater distance than the height of the knuckle ends of the axles, it follows that there will be vertical play between the steering knuckles and the axle, which play is resisted, yieldingly, by the springs 7 indirectly interposed between the axle and the ground outside the knuckle ends, so that the wheels move with relation to the axle in traveling over uneven ground, and the movement is absorbed by the springs. The axle and the vehicle body separated thereby remain steady, and receive no shock or jolt. The springs 7 may be of any desired strength to do all the work necessary for shock absorption, or may be calculated to do this to a predetermined degree only, in which latter event the ordinary body springs 3 come into play after the springs 7, the movement of the wheels being transmitted to said springs 3 through the bolts 6 and the axle 2, and absorbed by said body springs.

For the sake of appearance and to prevent dust and dirt from gathering on the springs 7 and the parts coöperating therewith, these parts are inclosed in a housing protected or covered by a cap 8ª, which from choice is made removable, as shown in Fig. 2.

Figs. 3 and 4 show a modified form of the organization wherein a steering knuckle 10 is pivotally connected with the knuckle end 4 of the axle 2 by means of a bolt 11 as usual. In this modified construction the spring-posts 13 are arranged laterally and outside of the forked ends of the axle. The steering knuckle 10 comprises lateral extensions through which the posts 13 project. The posts 13 are operatively connected to the axle by means of the plate 14 and bolt 11. Upon these posts and bearing at one end against the lateral extensions of the steering knuckle and at their other ends against the adjustable abutments or nuts 8ᵇ, are coiled compression springs 12. The operation of this construction of shock absorber is the same as that described with reference to Figs. 1 and 2.

The shock absorbers in the modified form of the device are, as in the preferred form, outside the kunckle ends of the axle, but on opposite lateral sides of said knuckle ends.

In both forms of invention shown the springs 7 and 12 will normally be under a predetermined degree of compression in order that depressions, as well as elevations of the surface traveled over, will be compensated for.

From what has been previously said, it is clear that either steering knuckle here described, in combination with the shock absorbing spring or springs placed outside the knuckle end of the axle form a structure which may readily be applied on automobile axles without changing their shape or substituting new knuckle ends. It is only necessary to remove the steering knuckles by withdrawing the pivot bolts, then substitute either form of steering knuckles heretofore described, insert the proper bolts and springs and finally screw up the fastening nuts on said bolts. Afterward, place the wheels on the new steering knuckles and the vehicle is ready for use.

Having thus described the invention, what I claim as new is:

1. In a spring wheel-suspension for vehicles having an axle with forked ends, a swivel-bolt passing through each of the forked ends of the axle, steering-knuckles provided with wheel-spindles swiveled and bodily movable upon said bolts, posts located outside the forked ends of the axle and having operative connection with the axle, and coiled springs arranged upon said posts and bearing at one end against the steering-knuckle and at their opposite ends against abutments carried by the posts.

2. In a spring wheel-suspension for vehicles having an axle with forked ends, a swivel-bolt passing through each of the forked ends of the axle, steering knuckles provided with wheel-spindles swiveled and bodily movable upon said bolts, posts located outside the forked ends of the axle, and having operative connection with the axle, and coiled springs arranged upon said posts and bearing at one end against the steering-knuckle and at their opposite ends against adjustable abutments carried by the posts.

3. In a spring wheel-suspension for vehicles having an axle with forked ends, a swivel-bolt passing through each of the forked ends of the axle, said bolts having projecting ends constituting posts, steering-knuckles provided with wheel-spindles swiveled and bodily movable on said bolts, and coiled springs arranged on the projecting ends of the bolts outside the forked ends of the axle and bearing at one end against the steering-knuckles and at their opposite ends against abutments on the posts.

In testimony whereof I have hereunto set my hand in presence of two subscribing witnesses.

CHARLES DURM SWORD.

Witnesses:
ARTHUR L. BRYANT,
GEO. W. REA.